(12) United States Patent
Bode et al.

(10) Patent No.: US 10,639,941 B2
(45) Date of Patent: May 5, 2020

(54) TIRE TREAD WITH BRIDGES

(71) Applicant: The Goodyear Tire & Rubber Company, Akron, OH (US)

(72) Inventors: Matthias Bode, Gruendau (DE); Helmut Wolfgang Fehl, Schluechtern (DE); Sebastien Willy Fontaine, Vichten (LU); Umit Bilmez, Hanau (DE); Heinrich Jens Stein, Langenselbold (DE); Armand Rene Gabriel Leconte, Bigonville (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 256 days.

(21) Appl. No.: 15/713,730

(22) Filed: Sep. 25, 2017

(65) Prior Publication Data

US 2018/0250989 A1 Sep. 6, 2018

Related U.S. Application Data

(60) Provisional application No. 62/467,391, filed on Mar. 6, 2017.

(51) Int. Cl.
*B60C 11/04* (2006.01)
*B60C 11/13* (2006.01)
*B60C 11/03* (2006.01)

(52) U.S. Cl.
CPC ...... *B60C 11/1369* (2013.01); *B60C 11/0304* (2013.01); *B60C 11/04* (2013.01); *B60C 11/042* (2013.01); *B60C 11/1307* (2013.01); *B60C 2011/0334* (2013.01); *B60C 2011/0355* (2013.01); *B60C 2011/0381* (2013.01)

(58) Field of Classification Search
CPC . B60C 11/04; B60C 11/1369; B60C 11/1353; B60C 11/1315; B60C 11/1323; B60C 11/0304; B60C 11/1307; B60C 11/0355; B60C 2011/0355; B60C 11/047; B60C 2011/0346

See application file for complete search history.

(56) References Cited

U.S. PATENT DOCUMENTS

| | | | | |
|---|---|---|---|---|
| 1,504,449 | A * | 8/1924 | Hargraves | B60O 7/00 152/209.22 |
| 3,727,661 | A * | 4/1973 | Hoke | B60C 11/032 152/209.22 |
| 4,865,099 | A * | 9/1989 | Goergen | B60C 11/0309 152/209.21 |
| 7,874,333 | B2 | 1/2011 | Durand | |
| D647,469 | S | 10/2011 | Youkong | |
| D670,232 | S | 11/2012 | Leendertse | |
| D673,893 | S | 1/2013 | Leendertse | |

(Continued)

*Primary Examiner* — Robert C Dye
*Assistant Examiner* — Debjani Roy
(74) *Attorney, Agent, or Firm* — Robert N. Lipcsik

(57) ABSTRACT

A tread for a tire includes a first circumferential main groove, a second circumferential main groove, and a third circumferential main groove. The first, second, and third circumferential main grooves together define a first shoulder rib, a first intermediate rib, a second intermediate rib, and a second shoulder rib. The third circumferential main groove includes a plurality of connecting bridges spaced circumferentially within the third circumferential main groove and axially joining the second intermediate rib and second shoulder rib.

3 Claims, 3 Drawing Sheets

(56) References Cited

U.S. PATENT DOCUMENTS

| | | |
|---|---|---|
| D730,269 S | 5/2015 | Maxwell |
| D743,874 S | 11/2015 | Philipot |
| 9,505,269 B2 | 11/2016 | Kudo |
| 9,878,585 B2 * | 1/2018 | Tanaka ................ B60C 11/1323 |
| 2007/0125467 A1 * | 6/2007 | Durand ............... B60C 11/0309 |
| | | 152/209.22 |
| 2017/0028790 A1 * | 2/2017 | Shmagranoff ........ B60C 11/047 |

\* cited by examiner

TIRE TREAD WITH BRIDGES

FIELD OF THE INVENTION

The present invention relates generally to tread bridges that stiffen up the tread pattern in the lateral, or axial, direction for improving steering performance.

BACKGROUND OF THE INVENTION

In view of resource saving and global environmental issues, pneumatic tires are increasingly being required to decrease the rolling resistance. The rolling resistance may be decreased by decreasing the energy loss in various rubber components of the tread of a tire. For that purpose, conventionally employed are elastomeric materials having as low heat generation properties as the rubber of the tread. Also, tread and sidewall volume is decreased. However, if the volume of the tread rubber and/or sidewall rubber is decreased, the noise performance during running, ride comfort, and other performance characteristics tend to deteriorate. If a tread rubber having a low heat generation property is used, the braking performance and steering stability tend to deteriorate. Thus, the reduction of rolling resistance has conventionally had an adverse effect on still other performance characteristics such as steering stability and braking performance.

BRIEF DESCRIPTION OF THE DRAWINGS

The present invention will be better understood through reference to the following description and the appended drawings, in which.

SUMMARY OF THE INVENTION

A tread for a tire in accordance with the present invention includes a first circumferential main groove, a second circumferential main groove, and a third circumferential main groove. The first, second, and third circumferential main grooves together define a first shoulder rib, a first intermediate rib, a second intermediate rib, and a second shoulder rib. The third circumferential main groove includes a plurality of connecting bridges spaced circumferentially within the third circumferential main groove and axially joining the second intermediate rib and second shoulder rib.

According to another aspect of the tread, the connecting bridges have a radial height between 40 percent and 60 percent of a radial depth of the third circumferential main groove.

According to still another aspect of the tread, the connecting bridges have circumferentially inclined edges.

According to yet another aspect of the tread, the connecting bridges have an inclined outer radial surface radially within the third circumferential main groove.

According to still another aspect of the tread, the connecting bridges have a flat outer radial surface radially within the third circumferential main groove.

According to yet another aspect of the tread, the connecting bridges have a only partially curved outer radial surface radially within the third circumferential main groove.

According to still another aspect of the tread, the connecting bridges have a completely curved outer radial surface radially within the third circumferential main groove.

According to yet another aspect of the tread, the connecting bridges have a V-shaped outer radial surface radially within the third circumferential main groove.

According to still another aspect of the tread, the connecting bridges have an asymmetric outer radial surface radially within the third circumferential main groove.

DEFINITIONS

Equatorial plane means the plane perpendicular to the axis of rotation of the tire and dividing the tire into two substantially equal halves.

Meridian plane means the plane containing the axis of rotation of the tire.

Radial direction means the direction perpendicular to the axis of rotation of the tire.

Transverse or axial direction means the direction parallel to the axis of rotation.

Circumferential or longitudinal direction means the direction perpendicular to the meridian plane and tangential to the running surface of the tread of the tire.

Connecting bridge in a groove may means an element of material between the two walls defining the groove. The function of the bridge may be prevent the two walls from moving towards each other.

DETAILED DESCRIPTION OF EXAMPLES OF THE PRESENT INVENTION

Figure 1:
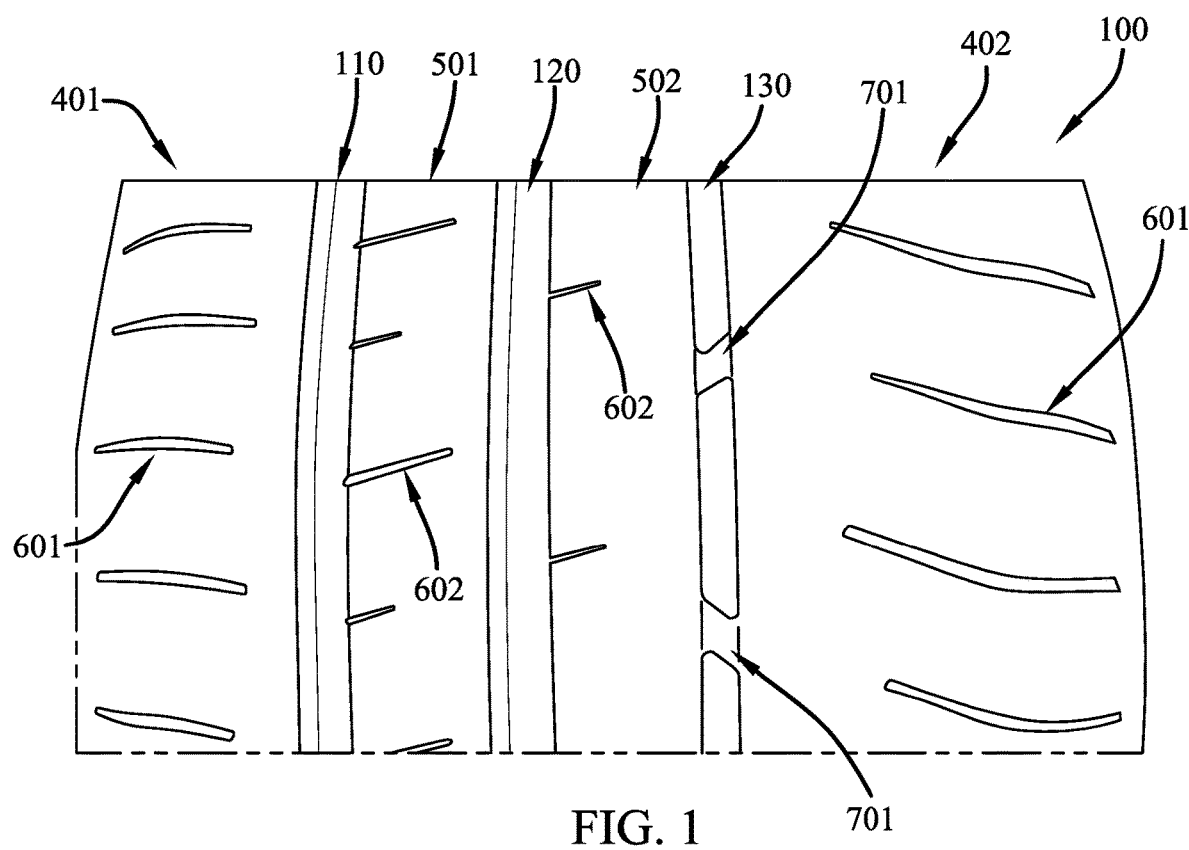
FIG. 1 is a schematic partial view of a tread in accordance with the present invention.
Figure 2:
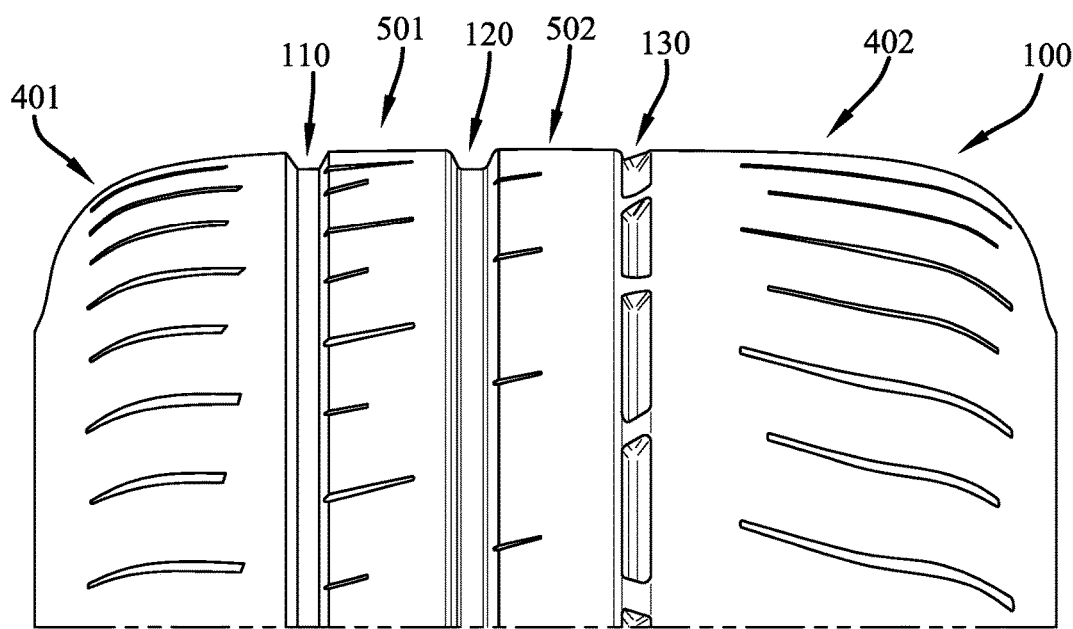
FIG. 2 is another schematic partial view of the tread of FIG. 1.
Figure 6:
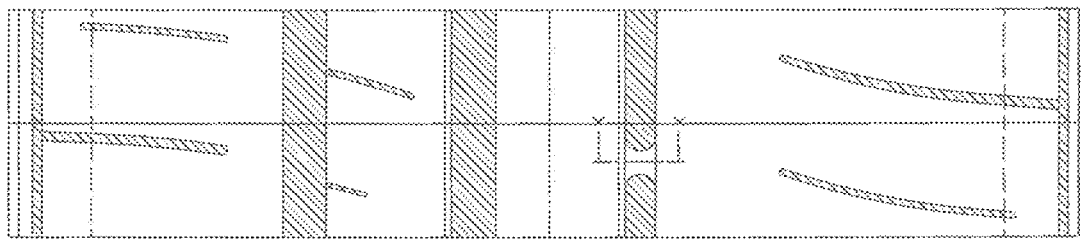
FIG. 6 is a schematic partial view of an example tread for use with the present invention.
Figure 5:
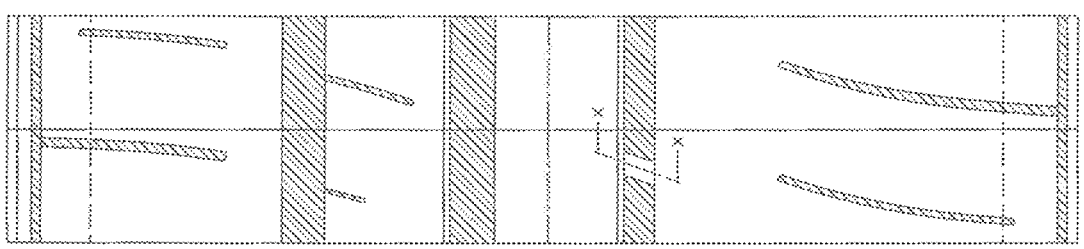
FIG. 5 is a schematic partial view of still another tread in accordance with the present invention.
Figure 4:
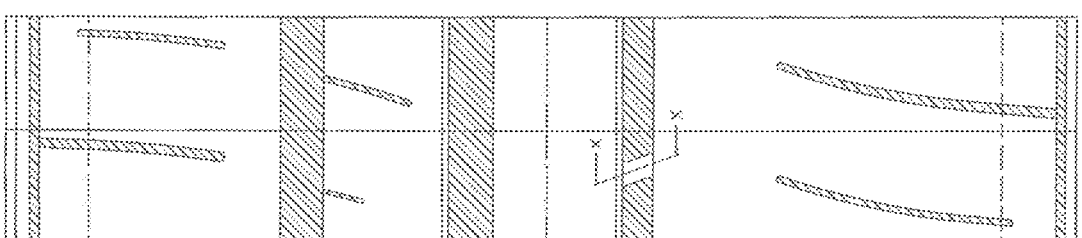
FIG. 4 is another schematic partial view of the tread of FIG. 1.
Figure 3:
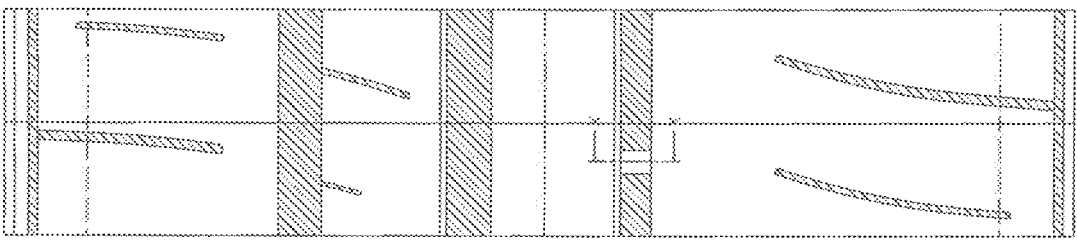
FIG. 3 is a schematic partial view of another tread in accordance with the present invention.
Figure 12:
FIG. 12 is a schematic cross-sectional view of still another groove for a tread in accordance with the present invention.
Figure 11:
FIG. 11 is a schematic cross-sectional view of yet another groove for a tread in accordance with the present invention.
Figure 10:
FIG. 10 is a schematic cross-sectional view of still another groove for a tread in accordance with the present invention.
Figure 9:
FIG. 9 is a schematic cross-sectional view of another groove for a tread in accordance with the present invention.
Figure 8:
FIG. 8 is a schematic cross-sectional view of a groove for a tread in accordance with the present invention.
Figure 7:
FIG. 7 is a schematic cross-sectional view of an example tread for use with the present invention.

As shown in FIGS. 1-2, a tread 100 in accordance with the present invention may have a first circumferential main groove 110, a second circumferential main groove 120, and a third circumferential main groove 130 defining a first shoulder rib 401, a first intermediate rib 501, a second intermediate rib 502, and a second shoulder rib 402. Each rib 401, 402, 501, 502 may have a variety of transverse grooves 601 and sipes 602 suitable for tire treads. One of the circumferential main grooves 110, 120, 130 (the third groove 130 in FIGS. 1-2) may have several connecting bridges 701 spaced circumferentially within the main groove. Similar tread structures are disclosed in U.S. Pat. Nos. 7,874,333 and 9,505,269, herein incorporated by reference in their entirety.

As many as thirty or more connecting bridges 701 may be included in a single tread 100 and thereby decrease rolling resistance of the tire. As an example, the connecting bridges 701 may connect the axially outer second shoulder rib 402 to the axially inner second intermediate rib 502 thereby increasing lateral stiffness of the tread 100. These connecting bridges may thus function as a combined tread element and increase bending and/or torsional stiffnesses of the tread 100. An increase of lateral stiffness and/or an increase of torsional stiffness may improve steering performance of the tread 100.

As shown in FIGS. 1-2, the tread 100 may define an asymmetric tread pattern. Such a pattern may perform an advantageous dynamic load transfer in cornering conditions with the outer part of tread 100 getting a higher load and the inside of the tire experiencing reduced load. Therefore, it may be advantageous and much more effective to provide a stiff outside area of a tread 100. Therefore, the third circumferential main groove 130 may have the connecting bridges 701. The less stiff inside area of the tread 100 may have more circumferential grooves, such as the first and second main circumferential grooves 110, 120 at the inner side of the tread 100. This may provide advantageous grip and keep hydroplaning to an acceptable level. The orientation of connecting bridges 701 in a lateral direction or angle may be used to achieve also enhance performance of tread 100. The orientation of the connecting bridges 701 in radial direction may further provide minimum groove volume open in the circumferential direction. This may be advantageous to reduce a drawback of the connecting bridges 701 with respect to hydroplaning and provide reduced negative effects of connecting bridges to pattern noise.

The connecting bridges, or Ti-Bars, in an outside groove, such as 130, may connect the second shoulder rib 402 to the second intermediate rib 502. This increased lateral tread stiffness may support additional vehicle loads under heavy handling conditions. Further, a closed hydroplaning groove, such as the transverse grooves 601 in the second shoulder rib 402, may provide additional noise improvement.

The connecting bridges 701 may have a radial height of between about 10 mm to about 25 mm to an unworn surface of the tread 100. The connecting bridges 701 may have axially inclined edges. The connecting bridges 701 may be inclined at angles between about 10 degrees to about 45 degrees, or about 15 degrees to about 30 degrees, with respect to the axial direction. These connecting bridges 701 bridges may be used in one outside circumferential groove 130 (FIG. 1). As stated above, the tread 100 may be asymmetric and may provide advantageous handling and steering performance. The overall number of connecting bridges 701 may be from about 15 to about 30 in a single circumferential groove, such as 130. Alternatively, overall number of connecting bridges in other grooves, such as 110, 120 may provide other advantageous features.

As stated above, the connecting bridges 701 may increase lateral tread stiffness of the tread 100. To prevent a closed volume in the third circumferential groove 130 leading to longitudinal hydroplaning and pattern noise, as shown in 7-12, the upper surface of the connecting bridges 701 may be radially below the outer radial surface of the tread 100. A minimum radial height of the connecting bridges 701 may be between about 3 mm to 5 mm above the bottom surface of the groove, such as 130. At this height, the connecting bridges 701 may be rigid enough to increase steering performance by increase lateral stiffness. Orientation of the connecting bridges 701 may further modify the tread 100 with still bigger increases in lateral tread stiffness, as shown in FIGS. 3-6.

Usage of the connecting bridges 701 in the circumferential grooves 130 in a shoulder area and circumferential grooves in an intermediate area may increase tread stiffness in lateral direction and steering performance because the tread 100 may transmit higher lateral forces compared to circumferential grooves without connecting bridges. Reduced bending/deformation of tread 100 in severe cornering conditions may improve contact between tread and the road in the tire footprint. Thus, the tread 100 may achieve higher mechanical grip levels and improved wear appearance/performance. Since the volume of circumferential groove 130 is not closed off completely, noise and hydroplaning are not deteriorated (e.g., flow of air and water in circumferential groove is still possible).

Applicants understand that many other variations are apparent to one of ordinary skill in the art from a reading of the above specification. These variations and other variations are within the spirit and scope of the present invention as defined by the following appended claims.

What is claimed:

1. A tread for a tire comprising:
   a first circumferential main groove;
   a second circumferential main groove; and
   a third circumferential main groove, the first, second, and third circumferential main grooves together defining a first shoulder rib, a first intermediate rib, a second intermediate rib, and a second shoulder rib,
   the third circumferential main groove includes a plurality of connecting bridges spaced circumferentially within the main groove and axially joining the second intermediate rib and second shoulder rib, the connecting bridges having a radial height between 40 percent and 60 percent of a radial depth of the third circumferential main groove, the connecting bridges have a V-shaped and inclined outer radial surface radially within the third circumferential main groove, the connecting bridges being inclined at angles between 10 degrees to 45 degrees with respect to an axial direction of the tread, an overall number of the connecting bridges in the third circumferential main groove being from 15 to 30.

2. The tread as set forth in claim 1 wherein the connecting bridges have circumferentially inclined edges.

3. The tread as set forth in claim 1 wherein the connecting bridges have a flat outer radial surface radially within the third circumferential main groove.

* * * * *